(No Model.) 2 Sheets—Sheet 1.
W. H. WILLIAMS.
SAW SWAGE AND SHARPENER.
No. 385,290. Patented June 26, 1888.
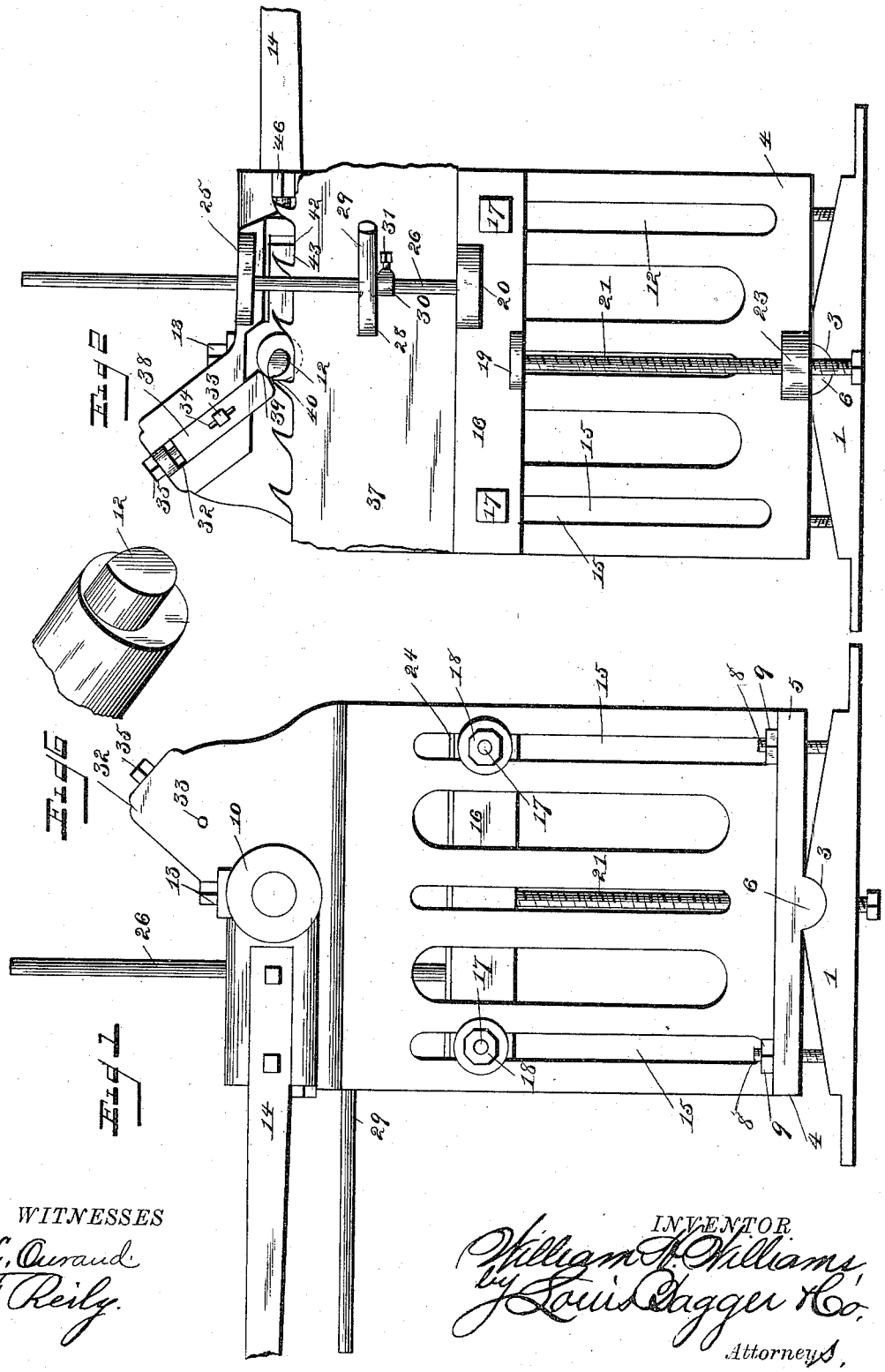
WITNESSES
F. L. Durand
J. F. Reily
INVENTOR
William H. Williams
by Louis Bagger & Co.
Attorneys.

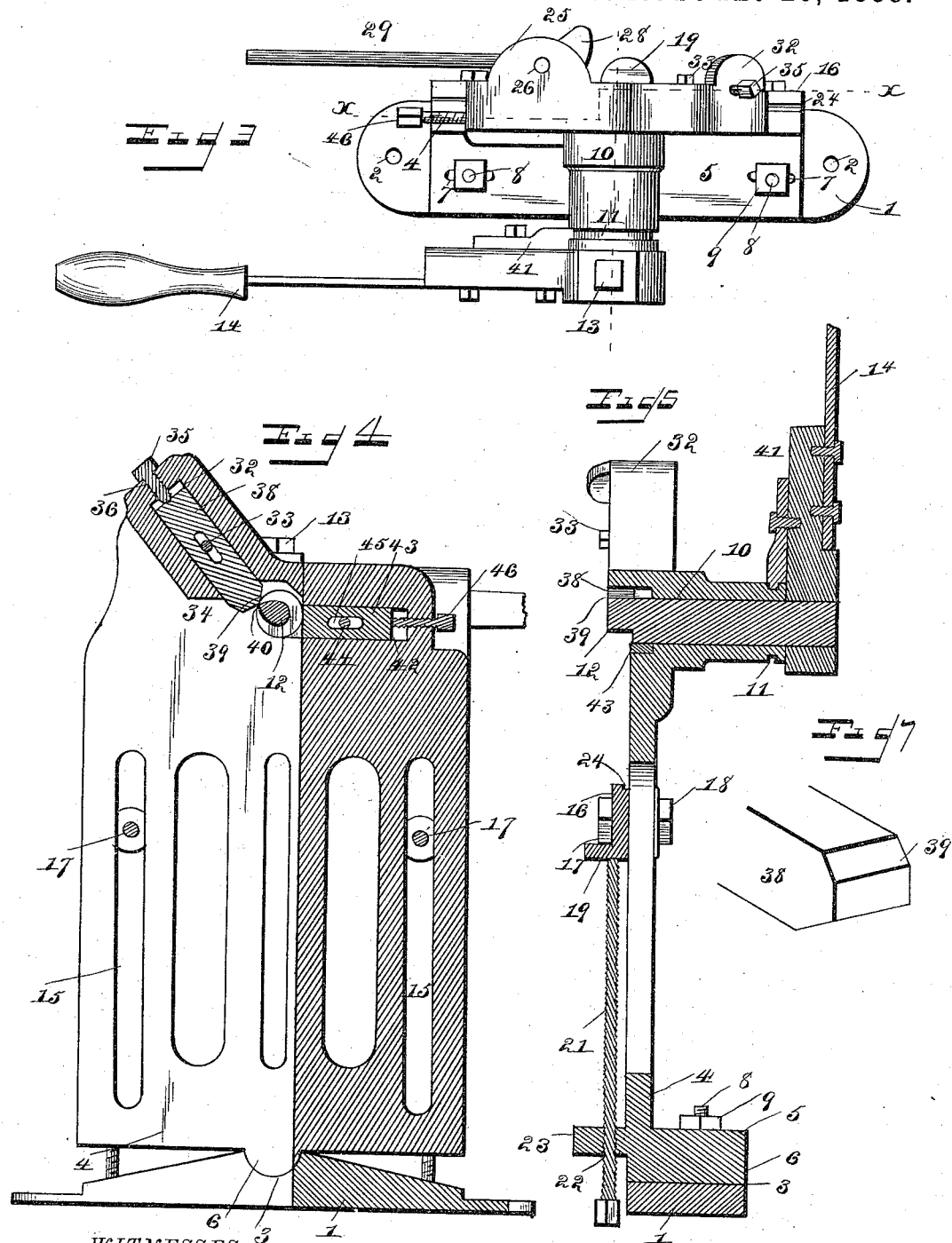

UNITED STATES PATENT OFFICE.

WILLIAM H. WILLIAMS, OF HUNTINGTON, WEST VIRGINIA.

SAW SWAGE AND SHARPENER.

SPECIFICATION forming part of Letters Patent No. 385,290, dated June 26, 1888.

Application filed December 14, 1887. Serial No. 257,899. (No model.)

*To all whom it may concern:*

Be it known that I, WILLIAM H. WILLIAMS, a citizen of the United States, and a resident of Huntington, in the county of Cabell and State of West Virginia, have invented certain new and useful Improvements in Saw Swages and Sharpeners; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my new and improved combined saw swage and sharpener. Fig. 2 is a side elevation taken from the opposite side to that shown in Fig. 1 of the drawings. Fig. 3 is a top plan view. Fig. 4 is a vertical sectional view taken on line *x x* of Fig. 3. Fig. 5 is a transverse vertical central sectional view taken with the handle of the device elevated; and Figs. 6 and 7 are detail views, on an enlarged scale, of the ends of the two dies, hereinafter described.

The same numerals of reference indicate corresponding parts in all the figures.

My invention consists in a new and improved device for swaging and sharpening saws, and my invention will be hereinafter fully described and claimed.

Referring to the several parts by their designating numerals, 1 indicates the base of my combined saw swage and sharpener, the said base being designed to be secured upon a bench or suitable support by bolts passing through holes 2 2 near its ends. The upper surface of this base-piece inclines down from the center toward each end, the raised center of the base being formed with the transverse semicircular recess 3, which forms a bearing for the lower end of the main frame 4 of my invention. This upright main frame 4 is formed with the wide bottom piece, 5, across the lower side of the center of which is formed the bearing or projection 6, which is semicircular in cross-section, to adapt it to fit and turn in the semicircular recess 3 in the elevated center of the base-piece 1. The lower end of the main frame is thus centrally supported on the central part of the base 1, and the wide bottom piece, 5, of the main frame is formed near its ends with the longitudinal slots 7 7, through which pass the upper ends of bolts 8 8, which pass up through round holes in the base 1, near the ends of the same, and as the upper surface of the base slants or inclines down to each end from the center it will be seen that by loosening one of the nuts 9 on the upper threaded ends of the bolts 8 8 and screwing down the other nut the main frame can be tilted to either side, for the purpose which will be hereinafter specified.

At the upper end of the main frame 4 is formed centrally a tubular bearing, 10, which is formed near its outer end with an exterior annular groove, 11. In this tubular bearing fits and turns the round die 12, the body of which is round in cross-section, and upon the projecting rear end of this die is rigidly secured by a set-screw, 13, the operating-handle 14, by means of which the machine is operated.

The body of the main frame 4 is formed with the longitudinal slots 15 15, and against the front side of this upright main frame is secured adjustably a flat transverse bar, 16, by means of bolts 17 17, which pass through holes in its ends and through the slots 15 15 of the main frame. These headed bolts have nuts 18 on their threaded ends, these nuts being loosened when the transverse bar is to be adjusted and tightened after the bar has been adjusted, to secure it firmly in its adjusted position. This transverse bar is formed on its outer side with the two lugs 19 20, and against the lower side of the central lug, 19, bears the upper end of an adjusting-screw, 21, by means of which the transverse bar can be adjusted to suit the size of the saw which is to be swaged and sharpened, this adjusting-screw working in a threaded opening, 22, in a lug, 23, formed at the bottom of the main frame, on the outer side of the same. The transverse bar 16 is recessed longitudinally along its upper inner edge, to form on its inner side, near its top edge, the longitudinal shoulder 24. A lug, 25, is formed at the top of the main frame, on the front side of the same, above in line with the larger lug, 20, which is formed on the outer side of the transverse bar 16. A circular rod, 26, passes down through the circular opening in the lug 25 at the top of the main frame, with its lower end resting in a recess formed in the upper side of the lug 20 on the transverse bar, and upon the central part of this rod is supported a locking-cam, 28, which is formed with an operating-handle, 29. This cam is supported by a collar, 30, which is in turn held in position on the rod 26 by a set-screw, 31.

The upper end of the main frame is formed with the recessed slanting bearing 32, in which fits and moves the die, which I shall denominate the "square" die, 38, as the body of this die is square in cross-section. The slanting recess in this bearing is of such depth that the square die will fit in it, and the die is held adjustably in position by means of a threaded bolt or screw, 33, which passes through a longitudinal slot, 34, in the said die into the back of the bearing 32. By loosening this bolt slightly the die can be adjusted and moved down to take up wear, and can then be tightened to secure the die firmly in its adjusted position. This adjustment is effected by means of an adjusting-screw, 35, which works in a threaded aperture, 36, in the top of the bearing 32, and bears with its inner end against the upper end of the square die.

In operation the main frame is tilted, as previously described, to adjust the machine to all shapes of teeth, and the saw-blade 37 is secured in position against the upper part of the front side of the main frame by resting the back edge of the blade in against the shoulder 24, formed along the inner upper edge of the transverse bar 16, when the bar 16 is adjusted to the required point by means of the adjusting-screw 21. The said bar is then secured in its adjusted position by tightening the nuts on the bolts at both of its ends, and the bar, being thus rigidly secured at both ends, cannot move or vibrate, and will thus do its work perfectly. The transverse bar 16 is thus adjusted to bring the blade up so that the tooth to be operated upon at the moment will stand with its point directly under and in contact with the lower operative end of the square die 38. This lower end of the slanting square die is cut off at an angle, as shown in the drawings, so as to leave the sharp transverse edge 39 where the round die, hereinafter described, comes in contact with it as the said die is turned, this construction causing the ends of the teeth that are too long to be cut off by the same movement which swages the tooth, thus leaving the saw in perfect joint.

The inner operative end of the round die 12 is cut into an oblong form, as shown in the drawings, the point 40 of this oblong end extending to the outside of the round die, as shown, the oblong point extending round from the central part of the die end to this side, a part of the end of the round die being cut away to form this oblong operative end. By thus removing a portion of the end of the die-body it will be seen that I am enabled to place the point of the saw-tooth over or above the center of the operative end of the round die, so that as this die is turned by its operating-handle it will be seen that the point of the oblong end of the die will push the metal of the end of the tooth up and spread the end of the tooth into the right shape against the flat part of the end of the square die, while when the end of the tooth is too long the end of the oval end portion of the round die will press the flattened end of the tooth against the sharp transverse edge or shoulder 39 on the square die until the round die comes in contact with the square die at that point, squeezing off the end of the tooth and leaving it the proper length.

It will be seen from the above that the one movement of the operating-handle of the machine will swage, sharpen, and joint the tooth, owing to the peculiar formation and shape of the two dies.

Before the operating-handle is turned to move the round die the saw-blade is locked in its adjusted position by means of the locking-cam 28, which is turned in by its handle, so as to press the saw-blade firmly against the front side of the main frame, thus holding the blade firmly in position while it is being operated upon, and preventing all possibility of its slipping to one side while the tooth is being swaged and sharpened.

The circular die is prevented from slipping or working back through its tubular bearing 10 by a stop-plate, 41, which is bolted to the inner side of the inner end part of the handle, and the inner end of which fits in the annular groove 11, which is formed in the outer end of the tubular bearing, the inner end of this stop-plate being curved so as to conform to the curvature of the tubular bearing.

The front side of the upper end of the main frame is formed to one side of the central bore in which the round die 12 works with a deep recess, 42, in which is placed a block, 43, which is held in position by a threaded bolt, 44, which passes through a slot, 45, from the back of the main frame into the block 43, this bolt being loosened to adjust the said block and tightened to secure the block in its adjusted position. This block is adjusted in by means of the screw 46, which works through a threaded opening at the outer end of the recess in which the said block is seated, and the inner end of this block is curved to conform to the curvature of the opening through which the round die passes, the inner end of the recess 42 communicating with the forward lower part of the round opening through which the round die passes. It will thus be seen that the curved inner end of the block 43 forms a bearing for the lower side of that end of the round die, and the block can be adjusted in by means of the end screw, 46, to take up wear and hold the round die always up to the square die 38, so that all lost motion can be taken up and prevented.

From the foregoing description, taken in connection with the accompanying drawings, the construction, operation, and advantages of my invention will be readily understood. It will be seen that my new and improved machine is comparatively simply and very strong in construction, and that it is exceedingly efficient and effective in its operation.

The machine is worked by turning the operating-handle back and forth, thereby spreading and sharpening the teeth, each tooth being finished and completed by one movement. This machine is especially designed for sharpening and swaging all kinds of saws for ripping wood.

Having thus described my invention, what I claim, and desire to secure by Letters Patent of the United States, is—

1. In a saw swaging and sharpening machine, the combination, with the round die formed with the cut-away oblong operative end, of the square die cut away at its lower operative end to form the sharp transverse shoulder, substantially as set forth.

2. The combination, with the main frame formed at its upper end with the tubular bearing having the exterior annular groove, of the round die and the handle secured to the outer end of the said die and having the stop-plate, substantially as set forth.

3. The combination of the main frame formed at its upper end with the tubular bearing and the inclined recessed bearing, the square die, and the round die.

4. The combination of the main frame formed at its upper end with the tubular bearing and the inclined recessed bearing, the square die formed with the longitudinal slot, the set-screw and adjusting-screw for the said die, and the round die having the operating-handle, substantially as set forth.

5. The combination, with the main frame formed at its upper end with the tubular bearing, and the horizontal recess opening at its inner end into the forward end of the said bearing, and the inclined recessed bearing, of the square die, the round die having the operating-handle, and the block formed with the curved inner end and having the retaining-screw passing through a slot in the main frame, and the adjusting-screw, substantially as set forth.

6. The combination, with the main frame formed with the longitudinal slots and the bottom lug on its front side, of the transverse bar having the retaining-bolts at its ends and formed with the central lug on its outer side, and cut away along its upper inner edge to form the longitudinal shoulder, and the adjusting-screw, substantially as set forth.

7. The combination, with the main frame formed with the longitudinal slots and the bottom and top lugs on its front side, of the transverse bar having the retaining-bolts at its ends, formed with the two outer lugs, and cut away along its inner upper edge to form the longitudinal shoulder, the adjusting-screw, the rod 26, and the locking-cam, substantially as set forth.

8. The combination of the base formed with the inclined upper side and the central transverse recess, the main frame formed with the wide bottom piece having the end slots and the central bearing, the bottom and top lugs, the longitudinal slots, and the bearings at its upper end, the transverse bar having the end bolts and formed with the longitudinal shoulder and the outer lugs, the adjusting-screw, the rod 26, and the locking-cam, the square die, the round die having the operating-handle, and the adjustable block formed with the curved inner end, substantially as set forth.

In testimony that I claim the foregoing as my own I have hereunto affixed my signature in presence of two witnesses.

WILLIAM H. WILLIAMS.

Witnesses:
   JAS. C. RUSSELL,
   JAMES H. FERGUSON.